US009262125B2

(12) United States Patent
Mihalcea

(10) Patent No.: US 9,262,125 B2
(45) Date of Patent: Feb. 16, 2016

(54) CONTEXTUAL FOCUS-AGNOSTIC PARSING-VALIDATED ALTERNATIVES INFORMATION

(71) Applicant: Microsoft Corporation, Redmond, WA (US)

(72) Inventor: Bogdan Ionut Mihalcea, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/277,921

(22) Filed: May 15, 2014

(65) Prior Publication Data
US 2015/0331673 A1    Nov. 19, 2015

(51) Int. Cl.
G06F 9/44    (2006.01)

(52) U.S. Cl.
CPC ........................................ *G06F 8/00* (2013.01)

(58) Field of Classification Search
None
See application file for complete search history.

(56) References Cited

U.S. PATENT DOCUMENTS

| | | | | |
|---|---|---|---|---|
| 6,083,282 | A * | 7/2000 | Caron et al. ................... | 717/101 |
| 6,968,541 | B1 * | 11/2005 | Hanson et al. ................ | 717/136 |
| 7,096,465 | B1 * | 8/2006 | Dardinski .......... | G05B 19/0426 |
| | | | | 717/121 |
| 7,124,400 | B2 * | 10/2006 | Mortensen ................ | G06F 8/71 |
| | | | | 717/121 |
| 7,127,707 | B1 | 10/2006 | Mishra et al. | |
| 7,552,420 | B1 * | 6/2009 | Smith .................. | G06F 9/44505 |
| | | | | 717/121 |
| 7,720,209 | B2 * | 5/2010 | Ovsyannikov et al. .. | 379/201.01 |
| 7,757,212 | B2 * | 7/2010 | Wagner et al. ................ | 717/120 |
| 7,765,520 | B2 * | 7/2010 | Wagner et al. ................ | 717/101 |
| 8,028,272 | B2 * | 9/2011 | Eldridge ................ | G05B 15/02 |
| | | | | 717/121 |

(Continued)

FOREIGN PATENT DOCUMENTS

WO    2009083732 A1    7/2009

OTHER PUBLICATIONS

Hupfer, et al., "Introducing Collaboration into an Application Development Environment", 2004 ACM; [retrieved on Sep. 28, 2015]; Retrieved from Internet<URL:http://dl.acm.org/citation.cfm?id=1031607.1031611>; pp. 21-24.*

(Continued)

*Primary Examiner* — Xi D Chen
(74) *Attorney, Agent, or Firm* — Kevin Sullivan; Kate Drakos; Micky Minhas

(57) ABSTRACT

Parsing-validated alternatives information (PVAI) is acquired from inactive software development contexts and displayed in the current context to help developers understand how changes to an artifact will impact other contexts. A PVAI request occurs at user request or proactively, in a stand-alone tool or an integrated development environment. PVAI is obtained and acquired from active and inactive contexts, unified, and displayed with corresponding context IDs. PVAI provides parsing-validated information for identifier auto-completion, parameter selection, class or object member selection, routine references, and software construct declarations. Development contexts have dimensions such as target platform, lifecycle configuration, target operating system, graphics processing configuration, numeric processing configuration, IDE project, and licensing configuration. Development context candidates for PVAI acquisition are determined from user preferences and by exclusion of unrealized contexts. PVAI acquisition cost is reduced by reusing computational results in another context. PVAI code can be distributed and/or run in the background.

20 Claims, 3 Drawing Sheets

(56) References Cited

U.S. PATENT DOCUMENTS

| | | | | |
|---|---|---|---|---|
| 8,146,277 | B2* | 4/2012 | Engel | 40/453 |
| 8,291,371 | B2* | 10/2012 | Beaton et al. | 717/100 |
| 8,407,424 | B2* | 3/2013 | Dai et al. | 711/141 |
| 8,448,133 | B2* | 5/2013 | Malkin | G06F 8/36 717/122 |
| 8,463,816 | B2* | 6/2013 | Skubacz | G06F 19/322 717/120 |
| 8,464,205 | B2* | 6/2013 | Chaar | G06F 8/20 717/122 |
| 8,555,247 | B2* | 10/2013 | Keller | G06F 8/61 717/120 |
| 8,561,011 | B2* | 10/2013 | Komar et al. | 717/101 |
| 8,645,906 | B2* | 2/2014 | Jain | G06F 8/70 717/122 |
| 8,650,503 | B2* | 2/2014 | Mihalcea | 715/790 |
| 2004/0117789 | A1 | 6/2004 | Czajkowski et al. | |
| 2004/0181773 | A1* | 9/2004 | Mortensen | G06F 8/71 717/120 |
| 2005/0044529 | A1* | 2/2005 | Simons | G06F 8/61 717/120 |
| 2006/0206866 | A1* | 9/2006 | Eldrige | G05B 15/02 717/122 |
| 2006/0218528 | A1* | 9/2006 | Lerner | G06F 8/60 717/120 |
| 2008/0072210 | A1* | 3/2008 | Rush | G06F 8/33 717/121 |
| 2009/0293043 | A1* | 11/2009 | Begel | G06F 8/71 717/122 |
| 2010/0011337 | A1* | 1/2010 | Young et al. | 717/104 |
| 2011/0010645 | A1 | 1/2011 | Mihalcea | |
| 2012/0198416 | A1 | 8/2012 | Sirr et al. | |
| 2012/0284685 | A1 | 11/2012 | Winternitz | |

OTHER PUBLICATIONS

Santosa, Wigdor, "A Field Study of Multi-Device Workflows in Distributed Workspaces"; 2013 ACM; [retrieved on Sep. 28, 2015]; Retrieved from Internet <URL: http://dl.acm.org/citation.cfm?id=2493432.2493476>;pp. 63-72.*

Ibrahim, et al., "Propagating Requirement Change into Software High Level Designs towards Resilient Software Evolution"; 2009 IEEE; [retrieved on Sep. 28, 2015]; Retrieved from Internet <URL: http://ieeexplore.ieee.org/stamp/stamp.jsp?tp=&arnumber=5358735>;pp. 347-354.*

Han, "Supporting Impact Analysis and Change Propagation in Software Engineering Environments"; 1997 IEEE; [retrieved on Sep. 28, 2015]; Retrieved from Internet <URL: http://ieeexplore.ieee.org/stamp/stamp.jsp?tp=&arnumber=615479>;pp. 172-182.*

"Build apps that target Windows and Windows Phone 8.1 by using Visual Studio (Windows Runtime apps using C#/VB/C++ and XAML)", Retrieved on: May 5, 2014 Retrieved from <<http://msdn.microsoft.com/en-us/library/windows/apps/dn609832.aspx>>.

"ReSharper: Turbocharge Your .NET Development", Published on: Jan. 24, 2011 . Retrieved from <<http://visualstudiogallery.msdn.microsoft.com/EA4AC039-1B5C-4D11-804E-9BEDE2E63ECF>>.

"Cross-Platform Development with the Portable Class Library", Published on: Apr. 10, 2012 Retrieved from <<http://msdn.microsoft.com/en-us/library/gg597391(v=vs.110).aspx>>.

Saxena, Navit, "Using Visual Studio to build Universal XAML Apps", Published on: Apr. 14, 2014 Retrieved from <<http://blogs.msdn.com/b/visualstudio/archive/2014/04/14/using-visual-studio-to-build-universal-xaml-apps.aspx>>.

"Bug: Intellisense believes itself in C++ while working on a C file.", Retrieved from <<http://social.msdn.microsoft.com/Forums/en-US/54995196-ab08-416d-9ddf-475bfb161779/bug-intellisense-believes-itself-in-c-while-working-on-a-c-file?forum=vcprerelease>>, Feb. 26, 2010.

Mitchell Slep, "C++ Gets Squiggles!", Retrieved from <<http://blogs.msdn.com/b/vcblog/archive/2009/06/01/c-gets-squiggles.aspx>>, Jun. 1, 2009.

Jimb Esser, "Intellisense Squiggles showing invalid errors (C++ compilation errors in a C file)", Retrieved from <<http://www.beta.microsoft.com/VisualStudio/feedback/details/632251/intellisense-squiggles-showing-invalid-errors-c-compilation errors-in-a-c-file>>, Feb. 18, 2011.

"64-Bit Transition Guide for Cocoa Touch: Converting Your App to a 64-Bit Binary", Retrieved from <<https://developer.apple.com/ . . . n/General/Conceptual/CocoaTouch64BitGuide/ConvertingYourAppto64-Bit/ConvertingYourAppto64-Bit.html>>, Feb. 11, 2014.

"Eclipse (software)", Retrieved from <<http://en.wikipedia.org/wiki/Eclipse_(software), May 3, 2014.

Robert N. Charette, "This Car Runs on Code", Retrieved from <<http://spectrum.ieee.org/transportation/systems/this-car-runs-on-code>>, Feb. 1, 2009.

"Integrated development environment", Retrieved from <<http://en.wikipedia.org/wiki/Integrated_development_environment>>, May 1, 2014.

"Intelligent code completion", Retrieved from <<http://en.wikipedia.org/wiki/Intelligent_code_completion>>, Apr. 29, 2014.

"NetBeans", Retrieved from <<http://en.wikipedia.org/wiki/Net_Beans>>, Mar. 27, 2014.

"Using IntelliSense", Retrieved from <<http://msdn.microsoft.com/en-us/library/hcw1s69b.aspx>>, Apr. 29, 2014.

"Visual Assist Features—Whole Tomato Software", Retrieved from <<https://www.wholetomato.com/features/default.asp>>, May 6, 2014.

"Visual Assist—a Visual Studio extension by Whole Tomato Software", Retrieved from <<https://www.wholetomato.com/>>, May 6, 2014.

"Options, Text Editor, C/C++, Advanced", Retrieved from <<http://msdn.microsoft.com/en-us/library/ff354890.aspx>>, May 8, 2014.

Mark Dickson, "SSMS and the IntelliSense Red Squiggle Mess", Retrieved from <<http://blogs.visoftinc.com/2014/02/21/ssms-and-the-intellisense-red-squiggle-mess/>>, Feb. 21, 2014.

Zain Naboulsi, "Visual Studio 2013: IntelliSense", Retrieved from <<http://blogs.msdn.com/b/zainnab/ archive/2013/08/06/visual-studio-2013-intellisense.aspx>>, Aug. 6, 2013.

Edgars Batnya, "VS2010 text editor double-click selection & Intellisense squiggle bug", Retrieved from <<http://www.beta.microsoft.com/VisualStudio/feedback/details/590720/vs2010-text-editor-double-click-selection-intellisense-squiggle-bug>>, Aug. 29, 2010.

* cited by examiner

SOME EXAMPLES OF
ACQUIRED PVAI 216 FROM NON-ACTIVE CONTEXT(S)

INACTIVE IDENTIFIER AUTOCOMPLETION ALTERNATIVES 302

INACTIVE PARAMETER SELECTION ALTERNATIVES 304

INACTIVE MEMBER SELECTION ALTERNATIVES 306

INACTIVE ROUTINE REFERENCE ALTERNATIVES 308

INACTIVE CONSTRUCT DECLARATION ALTERNATIVES 310

Fig. 3

SOME EXAMPLES OF CONTEXT DIMENSIONS 218

TARGET PLATFORM 402

LIFECYCLE CONFIGURATION 404

TARGET OPERATING SYSTEM 406

GRAPHICS PROCESSING CONFIGURATION 408

NUMERIC PROCESSING CONFIGURATION 410

IDE PROJECT 412

USER-DEFINED DIMENSIONS 414

LICENSING CONFIGURATION 416

Fig. 4

CONTEXTUAL FOCUS-AGNOSTIC PARSING-VALIDATED ALTERNATIVES INFORMATION

BACKGROUND

Software development includes writing software from scratch, adding new functionality to existing software, analyzing software, and/or correcting errors in software. Some software development efforts include only a single developer who is working on few thousand lines (or less) of source code. But many software development efforts include multiple developers working in one or more teams, and many products have software that includes tens of thousands of lines of code, or even more. Modern automobiles, for example, contain dozens of microprocessors which are controlled by software that contains tens of millions of lines of code.

To help developers manage the complexity of software development, tools have been created to assist with development activities such as editing code, checking code for errors, profiling code performance, controlling code versions, organizing code libraries, and building test or release versions of software programs. Some frequently used programming tools are available in integrated development environments (IDEs). IDEs give developers easy access to a group of software development tools, such as a source code editor, one or more build tools (e.g., compilers, interpreters, linkers), and a debugger. IDEs can increase developer productivity by providing tightly-coupled tools which have similar user interfaces and share information with one another. Instead of making a developer travel outside the IDE to work on different pieces of program code, the IDE brings selected pieces of code into focus, allowing the developer to make edits and investigate errors in that currently active piece of the program.

SUMMARY

Some embodiments are directed to the technical problem of reducing development context switches in order to increase developer productivity. Some embodiments assist software development by making information from inactive (a.k.a. non-active) development contexts easily available to developers, so they can better understand how changes to an artifact in the current context will impact the artifact in other contexts.

For example, during development of a software artifact which is being developed by a developer in a currently active software development context, some embodiments automatically acquire non-active context parsing-validated alternatives information (PVAI). This PVAI is acquired automatically from at least one currently non-active software development context of the software artifact. Productivity is enhanced in part because of the PVAI itself, which permits the developer to avoid diminishing the artifact's functionality in other contexts. Productivity is also enhanced because the PVAI is provided without making the developer leave the currently active software development context to get it.

In some embodiments, a software development aid receives a request for PVAI for an artifact in an active software development context. The software development aid may be a stand-alone tool such as a stand-alone code editor. However, in some embodiments the software development aid is part or all of an integrated development environment. The request is sometimes generated in response to an explicit user request for it, but sometimes the request is generated automatically, e.g., when a software development aid detects that the user may be typing an identifier. In either case, in response to a request for PVAI, utility code obtains active context PVAI for the artifact in the active software development context. In some embodiments PVAI code additionally acquires non-active context PVAI for at least one non-active software development context of the artifact. Then all of the obtained or acquired PVAI is displayed to the developer within the active software development context. Thus, a unified PVAI result is presented to the developer.

The PVAI may include alternatives for identifier auto-completion, parameter selection, class or object member selection, routine references, and software construct declarations. PVAI is "parsing-validated" in that it is generated and/or filtered using the kind of parsing and/or sematic analysis that occurs within compilers or interpreters. PVAI is different from (and likely more focused and so more useful than), mere editor "find" results or other text searches that do not go beyond string-matching.

In some embodiments, active and inactive development contexts are defined in terms of context dimensions. Some examples of context dimensions include target platform, life-cycle configuration, target operating system, graphics processing configuration, numeric processing configuration, IDE project, and licensing configuration. Users may also define context dimensions in some embodiments.

Some embodiments inform a developer explicitly and proactively which PVAI results correspond with which development context, while others show such correspondences only on request or not at all. Some embodiments include or exclude at least one candidate software development context with regard to PVAI acquisition, in response to an indication from the developer that the context is or is not of interest to the developer. Similarly, in some embodiments a knockout list or other mechanism is used to determine that one or more contexts is unrealized and hence should not be part of PVAI acquisition.

Some embodiments reduce processing costs of PVAI acquisition by reusing computational results from one context in a different context. Some also or alternatively include other measures to provide a better developer experience by making the PVAI requests more responsive. In some, PVAI code is distributed among multiple machines in a networked distributed computing architecture. In some embodiments, PVAI code runs in the background while a software development aid runs as a foreground process.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram further illustrating aspects of acquired parsing-validated alternatives information;

FIG. 4 is a block diagram further illustrating aspects of software development contexts.

DETAILED DESCRIPTION

Some Acronyms

Figure 1:
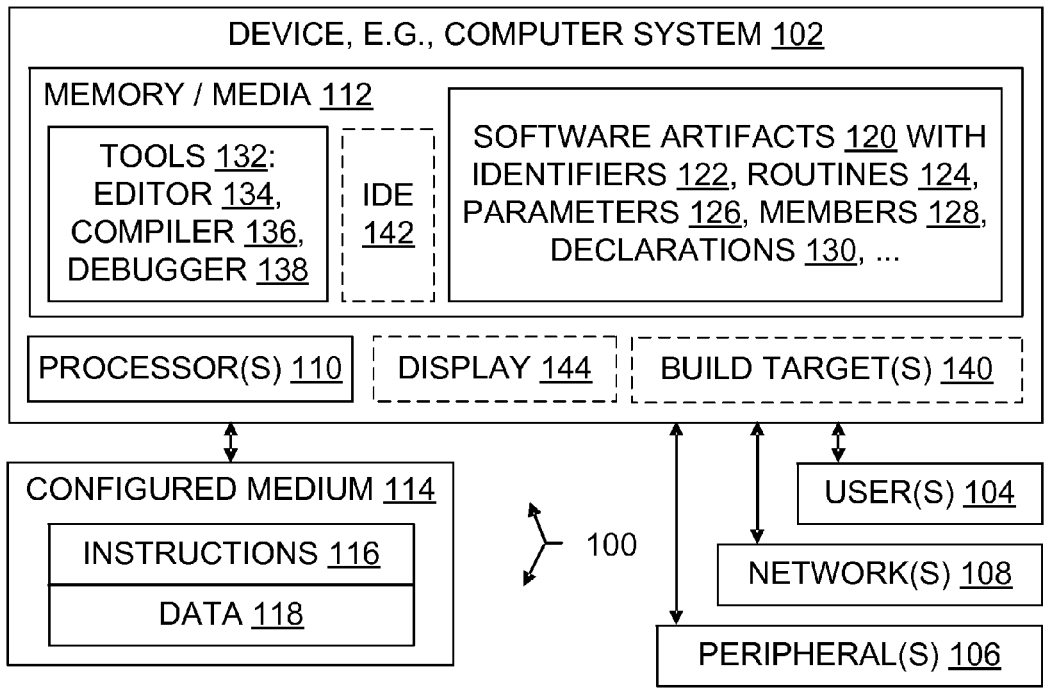
FIG. 1 is a block diagram illustrating a computer system having at least one processor and at least one memory which interact with one another under the control of software, and other items in an operating environment which may be present on multiple network nodes, and also illustrating configured storage medium (as opposed to a mere signal) embodiments.

Some acronyms are defined below; others are defined elsewhere in the disclosure and or require no definition for persons skilled in the art.

ALU: arithmetic and logic unit
API: application program interface
CPU: central processing unit
DSP: digital signal processing
FPGA: field-programmable gate array
FPU: floating point processing unit
GPU: graphical processing unit
IDE: integrated development environment, sometimes also called "interactive development environment"
PVAI: parsing-validated alternatives information
SSL: secure sockets layer Overview It is not unusual for computer software source code to be shared, in the sense that it is part of multiple development contexts. Such code is sometimes known as "shared code". For example, a cpp file may belong to multiple projects, or be used in multiple configurations which target different platforms and different levels of debugging/profiling instrumentation. In many familiar development environments, when a developer edits this shared code, their tools limit them to a current active context which makes significant assumptions about how to compile and build the edited code. For instance, one context may target a debugging-enabled build outcome, while another does not. One context may build an executable for a desktop while another builds an executable for a smartphone. One context may target a different operating system than another context, and so on.

Because contextually dependent PVAI specific to a source code file or other artifact is not unified and made easily available to the developer, changes made with the current context in mind can easily break some other context in which the artifact also participates. For example, some APIs are context-specific, so they can be properly called in one development context but will cause an error when called in another context. Errors arising from unconsidered development context dependencies can drain productivity, as developers either switch development contexts frequently by hand or else remain focused on a single context and then discover the errors later during builds. Moreover, the originally responsible developers who are often the most qualified to detect and remedy such errors may well have moved on to other work by the time such an error is discovered.

Some embodiments describe herein provide a unified view of PVAI, which includes not only the PVAI for an artifact in a current development context but also PVAI for one or more other development contexts of the artifact that are not currently active. Accordingly, a developer is able to see IntelliSense®-style information across multiple contexts for a source code file while remaining in the current context, even while the developer is editing the source code file. In some embodiments this information is computed and displayed for code that is shared across multiple projects. For example, while a user edits a cpp file they will receive accurate error-denoting squiggles from all non-active configurations and from all non-active projects along with the error squiggles (and/or or other error indicators) for currently active configuration and current project. Some embodiments run PVAI code in the background behind a foreground code editor process. Some run PVAI code having IntelliSense®-style functionality, which however is expanded beyond a single current context. The acquired PVAI from the background is merged with PVAI obtained from the foreground context, and displayed to the developer in a unified format.

Some embodiments described herein may be viewed in a broader context. For instance, concepts such as alternatives, context, errors, focus, parsing, and selection may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving alternatives, context, errors, focus, parsing, and/or selection are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical problems such as managing shared code development, detecting contextually-dependent errors, and integrating error reporting across multiple development contexts. Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein perform PVAI acquisition from non-active contexts and merge it with PVAI from the current context. Third, some embodiments include technical adaptations such as running PVAI code for multiple development contexts in the background and/or in a distributed architecture. Fourth, technical advantages of some embodiments include improved IDE usability, increased reliability of shared code, lower error rates in code which contains preprocessor directives, and simplified development of code targeting different build characteristics (context dimension values).

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to their his own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, creating, displaying, distributing, excluding, executing (a.k.a. running), generating, identifying, including, integrating, leaving, obtaining, parsing, receiving, reducing, remaining, requesting, residing, seeing, selecting, setting, switching, validating (and acquires, acquired, creates, created, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. No claim covers a signal per se. For the purposes of patent protection in the United States, a memory or other computer-readable storage medium is not a propagating signal or a carrier wave outside the scope of patentable subject matter under United States patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Herein "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more application components, source files, and other software artifacts 120 contain identifiers 122, routines 124, parameters 126, object and class members 128, declarations (a.k.a. definitions) 130, and other aspects familiar to software developers. Software development tools 132 such as editors 134, compilers 136, debuggers 138 and other tools assist with software development by producing and/or transforming artifacts 120 into executables, libraries, and other build targets 140.

A given operating environment 100 may include an Integrated Development Environment (IDE) 142 which provides a developer with a set of coordinated software development tools 132 such as compilers, source code editors, profilers, debuggers, and so on. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs.

The artifacts 120, tools 132, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation. In addition to processors 110 (CPUs, ALUs, FPUs, and/or GPUs), memory/storage media 112, display(s) 144, and battery(ies), an operating environment may also include other hardware, such as buses, power supplies, wired and wireless network interface cards, and accelerators, for instance, whose respective operations are described herein to the extent not already apparent to one of skill.

One of skill will appreciate that the foregoing aspects and other aspects presented herein under "Operating Environments" may also form part of a given embodiment. This document's headings are not intended to provide a strict classification of features into embodiment and non-embodiment feature classes.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment. FIG. 1 is provided for convenience; inclusion of an item in FIG. 1 does not imply that the item, or the describe use of the item, was known prior to the current innovations.

Systems and Processes

Figure 2:
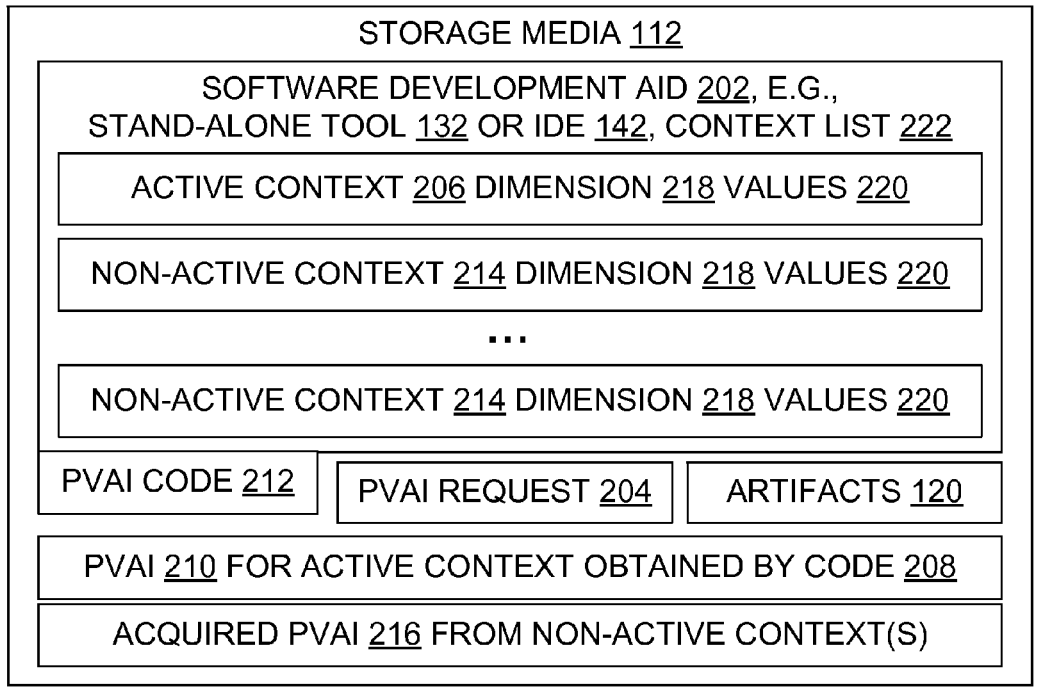
FIG. 2 is a block diagram illustrating aspects of contextual focus-agnostic parsing-validated alternatives information acquisition in an example architecture for software development.

FIGS. 2 through 4 illustrate aspects of an architecture which is suitable for use with some embodiments. Some embodiments provide a computer system 102 with a logical processor 110 and a memory medium 112 configured by circuitry, firmware, and/or software to provide technical effects such as PVAI from an inactive development context directed at technical problems such as shared code error prevention and detection, by extending functionality with IntelliSense®-like functionality beyond the current context 206 as described herein (IntelliSense is a mark of Microsoft Corporation).

Figure 5:
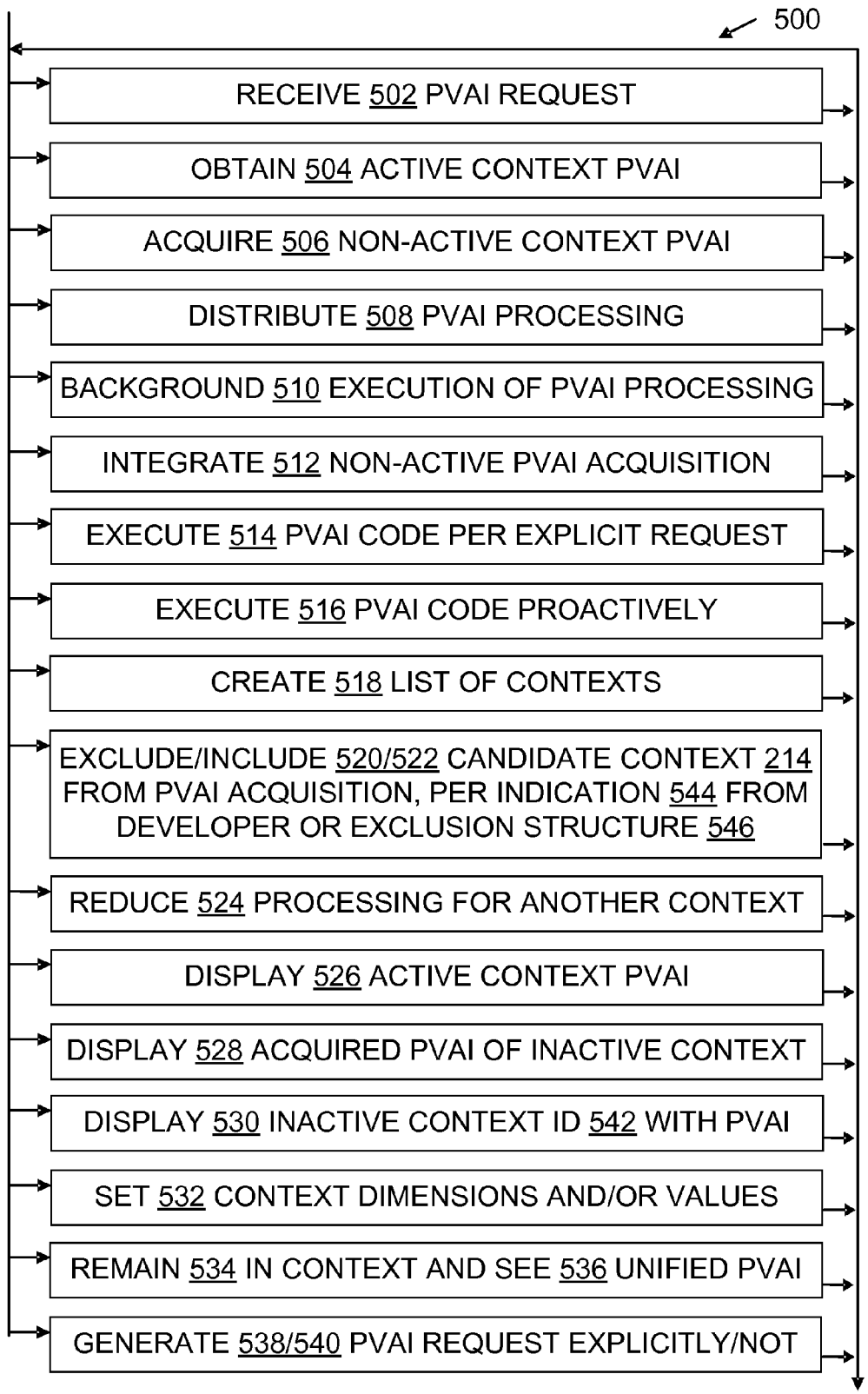
FIG. 5 is a flow chart illustrating steps of some process and configured storage medium embodiments.

FIG. 5 illustrates some related process embodiments in a flowchart 500. Technical processes shown in the Figures or otherwise disclosed may be performed in some embodiments automatically, e.g., by an IDE or its components under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 5. Steps may be performed serially, in a partially overlapping manner, or fully in parallel. The order in which flowchart 500 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

A software development aid 202 receives 502 a request 204 for parsing-validated alternatives information (PVAI) for an artifact 120 in an active software development context 206. The aid 202 is a non-human computational item. The request 204 takes the form of a routine call, signal, message, or other computational item. The request 204 is sometimes generated 538 in response 514 to an explicit user 104 action requesting PVAI, but sometimes the request 204 is generated 540 automatically, e.g., in response 516 to a software development aid 202 detecting that the user is typing an identifier 122. In either case, in response to a request for PVAI, utility code 208 such as Microsoft® IntelliSense® code 208 obtains 504 active context parsing-validated alternatives information 210 for the artifact in the currently active software development context 206 (Microsoft and IntelliSense are marks of Microsoft Corporation). Conventionally, PVAI for non-active contexts has been ignored; only the currently active development context was considered during efforts to obtain PVAI.

However, in some embodiments PVAI code 212 acquires 506 non-active context 214 parsing-validated alternatives information 216 for at least one non-active software development context 214 of the artifact 120. Then all of the parsing-validated alternatives information 210, 216 is displayed 526, 528 to the developer 104 within the active software development context 206. That is, a unified PVAI result (210 with 216) is presented (526 and 528) to the developer. Accordingly, a developer is able to see 536 IntelliSense®-style information 210 and 216 across multiple contexts 206 and 214 for a source code file 120 while remaining 534 in the current context, even while the developer 104 is editing the source code file. The gathering of PVAI thus becomes focus-agnostic, instead of favoring the current context by ignoring inactive contexts.

The software development aid 202 may be a stand-alone tool 132 such as a stand-alone code editor. A stand-alone smart code editor is one that lacks an integrated debugger or linker. However, in some embodiments the software development aid 202 is integrated 512 in the sense that it is part or all of an integrated development environment 142. Suitable IDEs 142 include a Microsoft® Visual Studio® integrated development environment (Microsoft and Visual Studio are marks of Microsoft Corporation), a NetBeans® integrated development environment (NetBeans is a mark of Oracle America, Inc.), an Eclipse™ integrated development environment (Eclipse is a mark of Eclipse.org Foundation, Inc.) and/or other integrated development environments.

The parsing-validated alternatives information (PVAI) 210, 216 may include alternatives for identifier autocompletion, parameter selection, class or object member selection, routine references, and software construct declarations. PVAI 210, 216 is "parsing-validated" in that it is generated and/or filtered using the kind of parsing and/or sematic analysis that occurs within compilers or interpreters. In particular, PVAI 216 from non-active contexts 214 includes information such as inactive identifier autocompletion alternatives 302, inactive parameter selection alternatives 304, inactive class or object member selection alternatives 306, inactive routine reference alternatives 308, and inactive software construct declarations alternatives 310. For purposes of the present disclosure, "declarations" of a software construct includes not only declarations per se but also software construct definitions.

For example, in some embodiments acquired PVAI 216 is generated and/or filtered during acquisition 506 by PVAI code 212 using lexical analysis, syntactic analysis, semantic analysis, and/or other computational techniques which are used in compilation and/or source code interpretation during parsing or other processing prior to object or executable code generation. For example, PVAI 216 may include parsing-validated identifier completion alternatives 302 for a string "fo" that contain a routine name "foo" as a completion alternative, but PVAI code 212 would not offer "food" as an identifer completion alternative when the word "food" appears in the source code only in comments or in other non-identifier roles. Thus, parsing-validated results are different from (and likely more useful than) mere editor "find" results or other text searches that do not go beyond string-matching. Similarly, PVAI 216 may include alternatives 304-310 for parameters, class or object members, routine references, and software construct declarations which are generated and/or filtered using lexical analysis, syntactic analysis, semantic analysis, and/or other computational techniques employed in compilation and/or source code interpretation during parsing or other processing prior to object or executable code generation.

In some embodiments, the active development context 206 and one or more inactive development contexts 214 are each defined in terms of context dimensions 218. Some examples of context dimensions include target platform 402, lifecycle configuration 404, target operating system 406, graphics processing configuration 408, numeric processing configuration 410, IDE project 412, and licensing configuration 416. Users may also define 532 context dimensions 414, 218 in some embodiments.

Some example values 220 for the target platform dimension 402 include ARM, Win32, and x64, denoting ARM architectures, 32-bit Microsoft® platforms, and 64-bit platforms respectively, or indications thereof. Some example values 220 for the lifecycle configuration 404 include debug, release, and check (a "check" configuration lacks the more complete debugging capabilities of the "debug" configuration and lacks the more optimized performance of a "release" configuration). Some example values 220 for the target operating system dimension 406 include iOS (mark of Apple Inc.), Windows® (mark of Microsoft Corporation), XBOX® (mark of Microsoft Corporation), Android® (mark of Google Inc.), and Linux® (mark of Linus Torvalds), or indications thereof. Some example values 220 for the graphics processing configuration dimension 408 include OpenGL® (mark of Silicon Graphics International Corp.), Direct3D® (mark of Microsoft Corporation), and particular graphics cards, or indications thereof. Some example values 220 for the numeric processing configuration 410 include DSP FPGA, SSL accelerator, and particular FPUs or math coprocessors, or indications thereof. Some example values 220 for the IDE project dimension 412 are different Visual Studio® (mark of Microsoft Corporation) projects that contain the same file, e.g., a particular include file whose preprocessor expansion brings in different code depending on the current project. Some example values 220 for the licensing configuration dimension 416 are 30-day-trial, single-user, single-site, and unlimited.

Some embodiments inform a developer explicitly which PVAI 210 of the current context and PVAI 216 of inactive context(s) (or in some embodiments only PVAI 216) correspond with which development context 206 or 214 (or in some embodiments only which context 214). For example, some embodiments display 530 an identification 542 of a software development context together on screen 144 with at least part of the acquired 506 parsing-validated alternatives information 216 for that software development context 214 in a table or list that makes the correspondence evident.

A list 222 of candidate contexts can be created 518 by taking combinations of possible values 220 for the context dimensions 218. This context list could be displayed and/or be used internally by a system 102. After creating 518 a list of candidate contexts by combining known context dimension and values, some embodiments include 522 or exclude 520 at least one candidate software development context 214 with regard to PVAI acquisition 506, in response to an indication 544 from the developer that the context is or is not of interest to the developer. For example, a developer may have interest in debug x64, check x64, release x64, debug ARM, and release ARM contexts 206, 214 but no interest in a check ARM context 214. The developer indicates 532 this preference through a PVAI code 212 user interface mechanism, by explicitly including 522 the contexts of interest and/or by explicitly excluding 520 the context that is not of interest. Then, while the developer works actively in any one of the five contexts that are of interest, PVAI code 212 in the background acquires 506 PVAI for the other four contexts of interest but avoids the computational expense of acquiring PVAI for the check ARM context.

Similarly, in some embodiments a knockout list, developer input, configuration file, or other exclusion structure 546 is used to determine that one or more contexts is unrealized and hence should not be excluded 520 from PVAI acquisition. For example, Apple, Inc. developer documentation states that "You can't build a 64-bit project if it targets an iOS version earlier than iOS 5.1." Accordingly, in some embodiments according to the present disclosure a development context having a target platform value indicating "64-bit" and a target operating system value indicating "earlier than iOS 5.1" would be excluded 520 from PVAI acquisition because that is unrealized development context.

Some embodiments reduce 524 processing costs of PVAI acquisition 506 by reusing computational results from one context 206 and/or 214 in a different context 214. For example, when acquiring identifiers, some string instances may be ruled out as inapplicable to any development context's PVAI because they fail parsing validation by virtue of being used in comments or literal strings. This applies not only to autocompletion, but also to identifiers considered during parameter selection, member selection, routine references, or declarations presentation PVAI acquisition efforts. Likewise, a construct which appears in code that is shared by multiple contexts and is not subject to any preprocessor directives (e.g., IFDEF directives) need only be parsed once to find its parameters, members, referenced routines, and construct declarations. By utilizing a PVAI acquisition 506 processing result from one software development context, such embodiments can reduce processing costs while acquiring parsing-validated alternatives information for another software development context.

Some embodiments include measures to provide a better developer experience by making the PVAI requests more responsive. In some, PVAI code is distributed 508 among multiple machines in a networked distributed computing architecture. In some embodiments, PVAI code runs 510 in the background while a software development aid runs as a foreground process.

Observations about IntelliSense®-Type Functionality

Additional details and design considerations are provided below. As with the other examples herein, the features described may be used individually and/or in combination, or not at all, in a given embodiment. Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from Visual Studio® IDE documentation; the Visual Studio® IDE is a solution implemented by Microsoft Corporation (Visual Studio® is a mark of Microsoft Corporation). Aspects of the Visual Studio® IDE and/or its documentation are consistent with or otherwise illustrate aspects of the embodiments described herein. However, it will be understood that Visual Studio® IDE documentation and/or implementation choices do not necessarily constrain the scope of such embodiments, and likewise that the Visual Studio® IDE and its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Write Cross-Platform Code in the Shared Project

In a Shared project, a developer typically writes code that runs on both platforms. One can also use the #ifdef directive to isolate sections of code that are platform-specific. The constants WINDOWS_APP and WINDOWS_PHONE_APP are conveniently predefined. (In C++ use this directive: #if WINAPI_FAMILY==WINAPI_FAMILY_PHONE_APP) . . . #endif. A developer can use drag-and-drop to move files from one of the platform-specific projects to the Shared project or vice versa to change the scope of the code.

Context Switcher in the Editor

While writing code in a Shared project, one can use the project context switcher in the navigation bar to select the platform one is actively targeting, which in turn drives the Intellisense® experience in the code editor (mark of Microsoft Corporation).

Platform Context in the Code Editor

When one is writing code in the Shared project, the Visual Studio® code editor uses a context that targets one platform or the other. In C#, the Intellisense® results that one sees while writing code is specific to the context of the code editor—that is, specific to Windows® or to Windows Phone® 8.1 (marks of Microsoft Corporation). In C++, the context (and not the startup project) determines whether the code inside the preprocessor directive #if WINAPI_FAMILY==WINAPI_FAMILY_PHONE_APP is greyed out or not.

If one uses an API in shared code that's not supported on both platforms, an error message will identify this API when one builds the project. A developer can confirm use of cross-platform APIs, however, without building the project. Switch the editor context in the drop-down list to the other platform to see squiggly lines under APIs that are not supported on that platform. Then isolate those APIs by using the #ifdef directive.

Some embodiments extend IntelliSense®-type functionality beyond its familiar role in the current development context, so readers who have not used that functionality may benefit from the following description (IntelliSense is a mark of Microsoft Corporation). A given embodiment need not implement every aspect of IntelliSense®-type functionality, and need not utilize the IntelliSense® mark except as required and authorized under trademark and/or contract law. The following discussion is based in part on Microsoft Developer Network documentation.

In some implementations, IntelliSense®-type functionality includes a number of features: List Members, Parameter Info, Quick Info, and Complete Word. These features help developers learn more about the code they are using, keep track of the parameters they are typing, and add calls to properties and methods with only a few keystrokes. Many aspects of IntelliSense®-type functionality are language-specific.

As to List Members, in some products a list of valid members from a type (or namespace) appears after a developer types a trigger character (for example, a period (.) in managed code or :: in C++). If the developer continues typing characters, the list is filtered to include only the members that begin with those characters. After selecting an item, the developer can insert it into code by pressing TAB or by typing a space. If the developer selects an item and types a period, the item appears followed by the period, which brings up another member list. When the developer selects an item but has not yet inserted it, the developer can get Quick Info for the item. In the member list, an icon to the left represents the type of the member, such as namespace, class, function, or variable. For a list of icons, see Class View and Object Browser Icons. The list may be quite long, so the developer can press PAGE UP and PAGE DOWN to move up or down in the list.

The developer can invoke the List Members feature manually by typing CTRL+J, clicking Edit/IntelliSense/List Members, or clicking the List Members button on the editor toolbar. When it is invoked on a blank line or outside a recognizable scope, the list displays symbols in the global namespace. To turn List Members off by default (so that it does not appear unless specifically invoked), go to Tools/Options/All languages and deselect Auto list members. To turn off List Members only for a specific language, go to the General settings for that language. The developer can also change to suggestion mode, in which only the text typed is inserted into the code. For example, if the developer enters an identifier that is not in the list and presses TAB, in completion mode the entry would replace the typed identifier. To toggle between completion mode and suggestion mode, press CTRL+ALT+SPACEBAR or click Edit/IntelliSense/Toggle Completion Mode.

As to Parameter Info, this aspect provides information about the number, names, and types of parameters required by a method, attribute generic type parameter (in C#), or template (in C++). The parameter in bold indicates the next parameter that is required as one types the function. For overloaded functions, the developer can use the UP and DOWN arrow keys to view alternative parameter information for the function overloads. When the developer annotates functions and parameters with XML Documentation comments, the comments will display as Parameter Info. The developer can manually invoke Parameter Info by clicking Edit IntelliSense/Parameter Info, typing CTRL+SHIFT+SPACE, or clicking the Parameter Info button on the editor toolbar.

As to Quick Info, this aspect displays the complete declaration for any identifier in the code. When the developer selects a member from the List Members box, Quick Info also appears. The developer can manually invoke Quick Info by clicking Edit/IntelliSense/Quick Info, typing CTRL+I, or clicking the Quick Info button on the editor toolbar. If a function is overloaded, code 208 may not display information for all forms of the overload. One can turn Quick Info off In C++ by setting Tools/Options/Text Editor/C/C++/Advanced/Auto Quick Info to false.

As to Complete Word, this aspect completes the rest of a variable, command, or function name once the developer has entered enough characters to disambiguate the term. One can invoke Complete Word by clicking Edit/IntelliSense/Complete Word, typing CTRL+SPACE, or clicking the Complete Word button on the editor toolbar. More generally, an auto-completion feature in some environments speeds up development by reducing typos and mistakes in identifier selection. Autocompletion may involve popups while the developer is typing, querying parameters of functions, and/or query hints related to syntax errors, for example.

The IntelliSense® options may not work as expected in certain cases. When the cursor is below a code error, PVAI may be incorrect or unavailable if an incomplete function or other error exists in the code above the cursor because code 208 might not be able to parse the code elements. One can resolve this problem by commenting out the applicable code. When the cursor is located in a code comment or a string literal, parsing does not proceed beyond determination of that location. For performance reasons, in some implementations a Find All References option displays raw textual search results by default instead of using IntelliSense®-like functionality to verify each candidate. One can clear this check box for more accurate results on all find operations. To filter on a per-search basis, open a shortcut menu for the result list, and then choose to Resolve Results. One can also hide unconfirmed items in the results.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, PVAI acquisition code 212 may run 510, 514, 516 on multiple devices/systems 102 in a networked cloud, and the PVAI 216 may configure the display on yet other cloud device(s)/system(s) 102.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as PVAI acquisition code 212 and displays of unified PVAI from multiple contexts 206 and 214, in the form of data 118 and instructions 116, read from a removable medium 114 and/or another source such as a network connection, to form a configured medium. The configured medium 112 is capable of causing a computer system to perform technical process steps for PVAI acquisition and display as disclosed herein. FIGS. 1 through 5 thus help illustrate configured storage media embodiments and process embodiments, as well as system and process embodiments. In particular, any of the process steps illustrated in FIG. 5, or otherwise taught herein, may be used to help configure a storage medium to form a configured medium embodiment.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational process performed by a software development aid, comprising:
   receiving in a digital memory a request for parsing-validated alternatives information for an artifact in an active software development context;
   obtaining active context parsing-validated alternatives information of the artifact for the active software development context of the artifact;
   acquiring, by execution of software instructions with at least one processor, at least one piece of non-active context parsing-validated alternatives information of the artifact for at least one non-active software development context of the artifact; and
   displaying both the active context parsing-validated alternatives information and the non-active context parsing-validated alternatives information within the active software development context in the software development aid, thereby facilitating understanding of how a change to the artifact in the currently active software development context will impact the artifact in the at least one non-active software development context.

2. The process of claim 1, wherein the acquired parsing-validated alternatives information includes at least one of the following: identifier autocompletion alternatives, parameter selection alternatives, member selection alternatives, alternative references to a routine, or alternative declarations of a software construct.

3. The process of claim 1, wherein the software development aid includes an integrated development environment.

4. The process of claim 1, wherein each of the software development contexts has at least one of the following context dimensions: target platform, lifecycle configuration, target operating system, graphics processing configuration, numeric processing configuration, licensing configuration, or IDE project.

5. The process of claim 1, wherein the process includes displaying an identification of at least one non-active software development context together with at least part of the acquired parsing-validated alternatives information for that software development context.

6. The process of claim 1, further comprising excluding at least one candidate software development context from the acquiring step.

7. The process of claim 1, further comprising utilizing a result of the acquiring step for one software development context to reduce processing while acquiring parsing-validated alternatives information for another software development context.

8. The process of claim 1, wherein the request for parsing-validated alternatives information is generated in response to an explicit user request for it.

9. A computer-readable storage medium configured with data and with instructions that when executed by at least one processor causes the processor(s) to perform a technical process comprising:

during development of a software artifact which is being developed by a developer in a currently active software development context of an integrated development environment, automatically acquiring, from at least one currently non-active software development context of the software artifact, at least one piece of non-active context parsing-validated alternatives information of the artifact, without the developer leaving the currently active software development context of the artifact; and automatically displaying the non-active context parsing-validated alternatives information in the integrated development environment while a developer's focus remains within the currently active software development context, thereby facilitating understanding of how a change to the artifact in the currently active software development context will impact the artifact in the at least one non-active software development context.

10. The configured medium of claim 9, wherein the acquired parsing-validated alternatives information includes at least one of the following: parameter selection alternatives, member selection alternatives, alternative references to a routine, or alternative declarations of a software construct.

11. The configured medium of claim 9, wherein the acquired parsing-validated alternatives information includes identifier autocompletion alternatives.

12. The configured medium of claim 9, wherein each of the software development contexts has at least one of the following context dimensions: target platform, lifecycle configuration, or target operating system.

13. The configured medium of claim 9, wherein each of the software development contexts has at least one of the following context dimensions: graphics processing configuration, numeric processing configuration, licensing configuration, or IDE project.

14. The configured medium of claim 9, further comprising at least one of the following:

excluding at least one candidate software development context from the acquiring step in response to an indication from the developer that the context is not of interest to the developer;

including at least one candidate software development context in the acquiring step in response to an indication from the developer that the context is of interest to the developer; or excluding at least one candidate software development context from the acquiring step in response to a determination that the context is an unrealized development context.

15. A computer system comprising:
a logical processor;
a memory in operable communication with the logical processor;
a software development aid residing in the memory and having instructions which upon execution by the logical processor interact with the memory to assist software development;
an artifact residing in the memory, the artifact having a currently active context in the software development aid and the artifact also having at least one other context which is not currently active in the software development aid; and
parsing-validated alternatives information (PVAI) code residing in the memory which upon execution by the logical processor automatically acquire PVAI of the artifact from at least one context of the artifact which is not currently active in the software development aid, thereby facilitating understanding of how a change to the artifact in the currently active software development context will impact the artifact in the at least one non-active software development context.

16. The system of claim 15, wherein the system comprises a list of context identifications in the memory, the list including identifications of contexts which differ from one another in value for at least two of the following context dimensions: target platform, lifecycle configuration, target operating system, graphics processing configuration, numeric processing configuration, licensing configuration, or IDE project.

17. The system of claim 16, wherein the list includes an identification of at least one of the following contexts and that context is not currently active in the software development aid:

a context having a target platform value specifying an ARM-based platform;
a context having a target platform value specifying an x64 platform;
a context having a lifecycle configuration value specifying a debug configuration;
a context having a lifecycle configuration value specifying a release configuration; or
a context having a target operating system value.

18. The system of claim 15, further comprising acquired PVAI which includes at least two of the following: identifier autocompletion alternatives, parameter selection alternatives, member selection alternatives, alternative references to a routine, or alternative declarations of a software construct.

19. The system of claim 15, further comprising acquired PVAI which includes at least three of the following: identifier autocompletion alternatives, parameter selection alternatives, member selection alternatives, alternative references to a routine, or alternative declarations of a software construct.

20. The system of claim 15, wherein the PVAI code is further characterized in at least one of the following ways:

PVAI code is distributed among multiple machines in a networked distributed computing portion of the system;
PVAI code runs in the background while the system runs the software development aid as a foreground process;
PVAI code and the software development aid are each part of an integrated development environment; or
PVAI code is executed automatically without an explicit user request for PVAI.

* * * * *